(12) United States Patent
Lingenhoel et al.

(10) Patent No.: US 9,533,830 B2
(45) Date of Patent: Jan. 3, 2017

(54) WORKPIECE CARRIER

(71) Applicant: Liebherr-Verzahntechnik GmbH, Kempten/Allgaeu (DE)

(72) Inventors: Klaus Lingenhoel, Kempten (DE); Roman Landerer, Sulzberg (DE); Michael Heuberger, Sulzberg (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 0 days.

(21) Appl. No.: 14/860,534

(22) Filed: Sep. 21, 2015

(65) Prior Publication Data
US 2016/0090242 A1 Mar. 31, 2016

(30) Foreign Application Priority Data
Sep. 30, 2014 (DE) .................. 10 2014 014 133

(51) Int. Cl.
*B65G 17/42* (2006.01)
*B65G 17/34* (2006.01)
(Continued)

(52) U.S. Cl.
CPC .............. *B65G 17/34* (2013.01); *B65G 17/14* (2013.01); *B65G 17/42* (2013.01); *B65G 19/02* (2013.01);
(Continued)

(58) Field of Classification Search
CPC ......... B65G 17/34; B65G 17/14; B65G 17/12; B65G 17/24; B65G 17/002; B65G 17/42; B65G 2812/02851; B65G 2812/02831
(Continued)

(56) References Cited

U.S. PATENT DOCUMENTS 4,718,349 A * 1/1988 Wahren .................. B65G 19/02
104/165
4,724,951 A * 2/1988 Shinkawa ............ B23Q 7/1457
198/867.13
(Continued)

FOREIGN PATENT DOCUMENTS

DE 20121809 U1 6/2003
DE 102006045575 A1 4/2008
(Continued)

*Primary Examiner* — Mark A Deuble
(74) *Attorney, Agent, or Firm* — Alleman Hall McCoy Russell & Tuttle LLP

(57) ABSTRACT

The present disclosure relates to a workpiece carrier for a workpiece conveying device for the transportation of workpieces, especially for heavy workpieces, having a conveyor chain for conveying the workpiece carriers by transmitting friction forces and having a guide track for guiding and supporting the conveyor chain and the workpiece carriers. The conveyor chain runs in a U-shaped guide track, wherein support surfaces extend next to the U-shaped guide track and the workpiece carriers are supported with guide rollers on said support surfaces. The workpiece carriers are equipped with a front and a rear carriage which are provided with an entrainer for engagement into the U-shaped cut-out, and wherein the entrainers are designed via a foot part with an adjustable contact force to overcome the sliding friction, with a display serving the visualization of the set contact force in accordance with the present disclosure.

10 Claims, 3 Drawing Sheets

(51) Int. Cl.
*B65G 19/02* (2006.01)
*B65G 35/06* (2006.01)
*B65G 17/14* (2006.01)

(52) U.S. Cl.
CPC ..... *B65G 35/06* (2013.01); *B65G 2812/02851* (2013.01)

(58) Field of Classification Search
USPC .................................................... 198/867.13
See application file for complete search history.

(56) References Cited

U.S. PATENT DOCUMENTS

| | | | | |
|---|---|---|---|---|
| 5,372,240 | A * | 12/1994 | Weskamp | B65G 17/002 198/465.1 |
| 6,237,755 | B1 * | 5/2001 | Clopton | B61B 10/022 198/779 |
| 6,318,546 | B2 * | 11/2001 | Koegler | 198/465.1 |
| 7,219,793 | B2 * | 5/2007 | Robertsson | B65G 17/002 104/26.2 |
| 7,320,396 | B2 * | 1/2008 | Oppermann | B65G 17/002 104/165 |
| 7,971,709 | B2 | 7/2011 | Krups et al. | |
| 8,727,100 | B2 * | 5/2014 | Ecob | B65G 21/2072 198/415 |
| 8,794,432 | B2 * | 8/2014 | Ek | B65G 47/53 198/465.2 |
| 2009/0260955 | A1 | 10/2009 | Krups et al. | |

FOREIGN PATENT DOCUMENTS

| | | |
|---|---|---|
| DE | 102008020052 A1 | 11/2009 |
| EP | 0203898 B1 | 12/1986 |

\* cited by examiner

WORKPIECE CARRIER

CROSS REFERENCE TO RELATED APPLICATION

This application claims priority to German Patent Application No. 10 2014 014 133.0, entitled "Workpiece Carrier," filed on Sep. 30, 2014, the entire contents of which is hereby incorporated by reference in its entirety for all purposes.

TECHNICAL FIELD

The present disclosure relates to a workpiece carrier for a workpiece conveying device for the transportation of workpieces, especially heavy workpieces.

BACKGROUND AND SUMMARY

There are in principle two different systems for conveying of workpieces by means of workpiece carriers. In one example system, the workpiece carriers are connected to a conveyor belt at fixed intervals. The conveyor belt is moved on in a clocked manner and thus travels the workpiece carriers from one position to the next. However, in this system the clocking has to be controlled based on the longest lasting process and that no channeling in or out of workpiece carriers can take place.

In another example system, the conveyor chain runs continuously and the workpiece carriers are taken along by the conveyor chain by means of frictional grip or the workpiece carriers are stopped by external stops and separators in front of processing points. The workpiece carriers can be diverted into secondary tracks via track switches and channeling-in and channeling-out devices.

However, in such systems the workpiece carriers may accumulate in certain situations in front of a processing point or transfer point. Due to such accumulations high strains may arise for the chain by the frictional forces acting on the chain and said high strains have to be taken into account in the design of the chain. In addition, considerable wear arises at the chain and at the entrainers of the tool carriers due to the constant friction. To minimize the wear, the chain is designed as large as necessary, in order to keep the friction force as small as possible. There are different approaches for this purpose, especially with heavy workpieces.

A workpiece conveying device for heavy workpieces having a plurality of workpiece carriers is known from EP 0 203 898. The workpiece carriers in this respect comprise a workpiece carrier for receiving the workpieces and a respective rotatable front and rear guide segment which establishes a connection with the belt arranged thereunder by means of a sliding shoe. The workpiece carriers are taken along by the belt by means of the friction force. The setting of the contact force for the sliding shoe takes place by selection of a suitable spring. Additionally or alternatively the preload force of the spring is correspondingly set by suitable underlaid disks. In this embodiment, the contact force is construed and set once and cannot be variably adapted to current demands.

In another example, DE 201 21 809 U1 describes a low-profile accumulating conveyor capable of negotiating curves and having a transport trolley. An adjustable entrainer is arranged at the lower side at the center of the transport trolley and it receives in its interior a friction element which is pressed down by a spring, which in turn is pressed against the surface of a pallet belt conveyor and which thus takes along the transport trolley. Contact force is applied by means of a compression spring which acts on the friction element. Its contact pressure is adjustable via a screw. The contact pressure is set such that the friction is respectively sufficient to move the transport trolley forward together with the supported load with the aid of the friction grip between the friction element and the pallet belt conveyor. The transport trolley itself in this respect rolls off on the transport belt with four individual casters.

However, in this embodiment, one potential issue is that every single entrainer of a transport trolley has to be set individually. Since there is no indication of the set force, this is a very time-consuming process. It must be checked individually by trials at each transport trolley whether the contact force is sufficient for the taking along. The user therefore tends to ensure in every case that the contact force is sufficient. There is therefore the risk in this respect that work is carried out with contact forces which are too high for safety reasons in order to ensure a reliable taking along in each case. However, this is then at the cost of the wear of the chain and of the workpiece carrier entrainer. If the accumulating conveyor is frequently converted and if different workpieces and thus transport trolleys of different weights are utilized, this requires a conversion process which may be time-consuming.

It is the object of the present disclosure to provide an adjustment mechanism for the contact force between entrainers and the belt with which a simple adaptation to different workpiece weights can take place in a simple manner for a plurality of workpiece carriers and with which a value which has once been set can be set reproducibly again—e.g. in the case of a workpiece change.

If this setting value has namely once been determined, it can also be stored for specific workpiece/workpiece carrier combinations or it can be noted on the workpiece carrier, and is available for the next conversion procedure as a predefined setting value. If the workpiece carriers and the chain have a certain wear after some time, the set values can be directly corrected without complex trials and adjustment work being required at each individual workpiece carrier.

This object is achieved by a workpiece conveying device for transportation of workpieces, comprising a conveyor chain for conveying workpiece carriers by transmitting friction forces; a U-shaped guide track for guiding and supporting the conveyor chain and the workpiece carriers; wherein support surfaces of the device extend next to the U-shaped guide track and the workpiece carriers are supported with guide rollers on said support surfaces, wherein each of the workpiece carriers are equipped with a front and a rear carriage which are provided with an adjustable entrainer for engagement into a U-shaped cut-out, wherein the adjustable entrainer for each of the workpiece carriers is designed via a foot part with an adjustable contact force to overcome sliding friction, and wherein the adjustable entrainer with a foot part has a display device for visualizing the set contact force.

In a further embodiment the object is achieved by a method for adjusting a plurality of workpiece carriers for a workpiece conveying device, comprising conveying the plurality of workpiece carriers on a conveyor chain by transmitting friction forces, wherein a U-shaped guide track guides and supports the conveyor chain and the workpiece carriers. The support surfaces extend next to the U-shaped guide track, the workpiece carriers are supported with guide rollers on the support surfaces; setting a contact force on an entrainer to overcome sliding friction, the entrainer provided on front and rear carriages of the workpiece carriers, and engaged into a U-shaped cut-out; visualizing the set contact force on the entrainer on a display device coupled to a foot part of the entrainer; setting the contact force on a first of the plurality of workpiece carriers by reading off a value from the display device; and transferring the set contact force to a remainder of the plurality of workpiece carriers.

Workpiece transport devices such as described in the present disclosure are transport devices in which the workpiece carriers are taken along by a transport chain by means of friction force. The transport chain in this respect frequently runs in a U-shaped cut-out at the center of a base belt body, driven by one or more electric motors. The workpiece carriers typically have two guide feet which stand on the chain in the U-shaped cut-out so that the transport chain can take along the workpiece carriers by means of friction force. Workpiece receivers are mounted on the workpiece carriers and are typically individually configured for the workpieces to be transported. In addition, the workpiece carriers are, just like the chain, guided laterally in the cut-out.

One or more workpiece carriers are accumulated in front of a processing station by a stop. Separator one of the guide feet of the frontmost workpiece carrier may be prevented from its forward movement by an inwardly pivotable abutment. In this respect, the belt runs continuously further beneath the tool carriers. If the stop or the separator is opened again, the transport chain again takes along the accumulated workpiece carriers until the stop or the separator is closed again.

Since the workpiece carriers lie loosely on the belt, they can, where necessary, be channeled out of the direct part flow by channeling in and out points and transported to separate processing stations. The workpiece carriers together with the workpieces arranged thereon can be raised by a separate lifting station at the processing station for the transfer of the workpieces to a processing device so that the workpiece can be raised from the workpiece receiver and can be processed. The workpiece can again be placed onto the workpiece receiver subsequent to the processing. Depending on the process sequence, the workpiece can, however, also be placed on an empty workpiece carrier arriving later.

With heavy workpieces, an attempt is made to configure the transport system for the workpieces such that substantial portions of the workpiece weight are taken up via additional rollers at the workpiece carriers. These rollers run on the base belt body or on special roller rails next to the base belt body.

Unlike with small workpieces in which the complete weight of the workpiece and workpiece carriers bears on the chain, there is the possibility with the embodiment in accordance with the present disclosure to design the transport belt/transport chain smaller due to the splitting of forces, for it only has to apply the force for overcoming the rolling friction which is necessary to move the workpiece carriers along the conveyor path on casters. In addition, the contact force which acts on the chain and which is necessary so that the workpiece carriers are taken along by the chain, may be adjustable.

There are different possibilities for applying this contact force to the belt in an adjustable manner. The simplest one is certainly that by means of a spring whose spring travel is variably adjustable by means of mechanical elements. In the embodiment in accordance with the present disclosure, the adjustment device is connected to a display device by means of which a characteristic value for the set spring force can be visualized. For example, it may be a display which maps the linear adjustment of the spring space, but may also be a pressure display which indicates the actual contact force. It is important that the display delivers reproducible characteristic values for the set contact force such that, the required force for taking along the workpiece carrier can be determined at a workpiece carrier. This is then transferred to the other workpiece carriers at the transport device by taking over the set and determined characteristic values.

If a specific wear is reached at the chain and at the entrainers after a specific time of use of the device, the contact force may be adjusted relatively easily in that the new setting value is determined at a workpiece carrier and said setting value can subsequently be transferred to the other workpiece carriers.

If different workpiece types are conveyed by one and the same transport device, the workpiece carriers can also be set to different contact forces. The user then also has the possibility by the visualization of the set values to check immediately whether the correct values are also set for the current workpiece type.

When necessary, this may take place, via an external control device, especially when the workpiece carriers are equipped with an individual marking or with a workpiece carrier identification device such as an RFID or a data carrier. An optical evaluation of the display or an electronic data transfer of the set values would be required for this. This would be of interest if the transport device runs over large paths within a factory automatization for linking a plurality of machines. A simple visualization is certainly sufficient for a simple machine automatization.

In a further embodiment of the present disclosure, the display device is protected from unintentional adjustment by a protective cover. It can thus be prevented that the contact force is adjusted in an unwanted manner on the handling of the workpiece carriers or of the workpieces on and with the carriers. The adjustment apparatus and its display device are furthermore protected against damage.

It would furthermore be possible to configure the protective cover such that it additionally prevents an unwanted adjustment of the contact force in that the cover achieves a blockage of the adjustment movement in a specific position. This could be achieved by a mechanical blockage apparatus which engages into or at one or more cut-outs or surfaces at the adjustment device. A clamping function would furthermore be possible which the protective device exerts on the adjustment device.

To adjust the adjustment device, the protective device can release the adjustment device by raising, tilting, displacing or rotating such that it can be adjusted. After the adjustment procedure, the adjustment device can be blocked again by a reverse movement.

Further features, details and advantages of the present disclosure will be explained in more detail in the following with reference to a plurality of drawings.

DETAILED DESCRIPTION

FIGS. 1 through 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Figure 1:
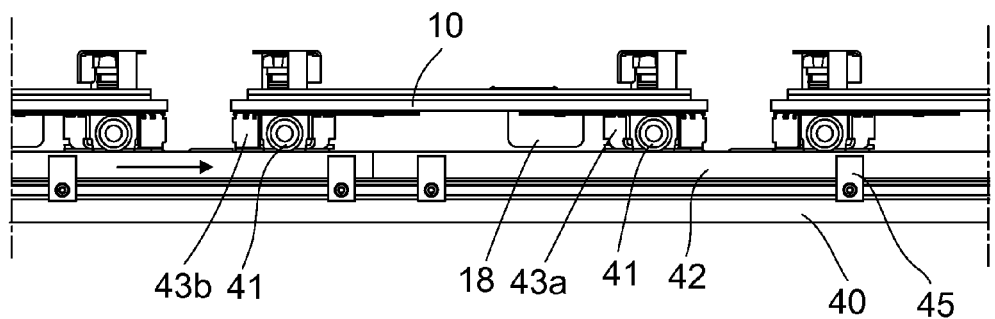
FIG. 1 shows a side view of a conveying apparatus in accordance with the present disclosure with a plurality of workpiece carriers.

FIG. 1 shows a side view of a conveying apparatus with a plurality of workpiece carriers which are standing behind one another on an accumulation path. The workpiece carriers 10 with the front and rear carriages 43a, 43b run with their rollers 41 on roller rails 42 which are mounted laterally at a base belt body 40. The carriages 43a, 43b are configured as a pivot axis similar to an articulated steering and are guided at the center in the base belt body. The roller trails, which substantially take up the workpiece weight, are connected to the base belt body 40 via clamping pieces 45 and may be replaced simply if wear occurs.

The workpiece carriers can be recognized via an identification device suitable for this purpose by the identification device 18 attached to the carriage and specific operations can be triggered at different points of the conveying device in dependence on the stored information. For example, the identification can take place optically via certain codes, e.g. a data matrix code, barcode, etc. or by reading out stored information from memories such as an RFID, transponder, etc. In this way, a chaotic production with different workpiece types on a conveying path may also be possible.

Figure 2:
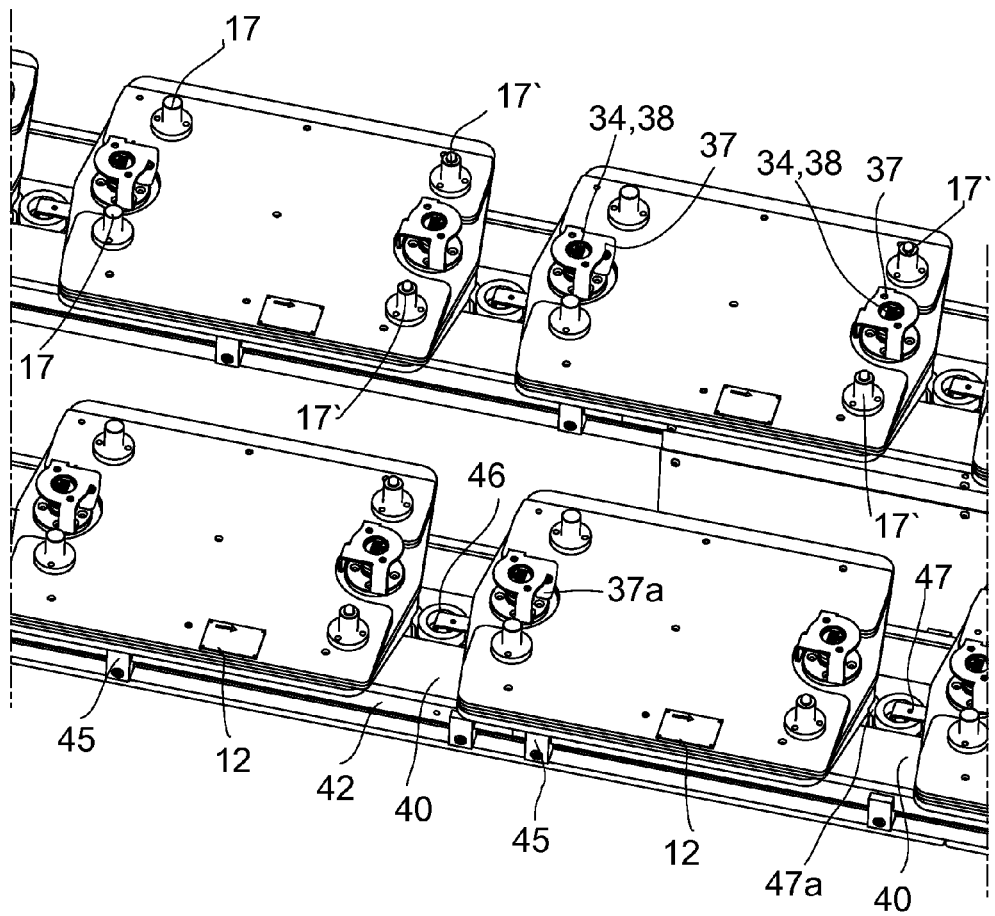
FIG. 2 shows a perspective view of a plurality of workpiece carriers in accordance with the present disclosure.

Further features of the device in accordance with the present disclosure are shown in the perspective view of the conveying path in FIG. 2. The contact force with which the entrainers are pressed against the belt can be set individually and also be checked easily using the adjustment device 38 for the contact force with an integrated display 34. A security 37a against adjustment is integrated into the protective cover 37 so that the set contact force is not adjusted accidentally. The workpieces which are conveyed by means of these workpiece carriers can be picked up by the workpiece carriers by means of simple workpiece mounting pins 17, 17' or via complex and heavier special workpiece mounts. These workpiece mounts influence the respective weight of the workpiece carriers and have to be taken into account when setting the friction force. With empty workpiece carriers, they travel on the chain belt only with the entrainers and not with the rollers 41 on the lateral roller rails 42 in order to reduce the wear. The contact force thus, however, has to be adapted individually to the weight of the workpiece carriers, which in turn requires a simple and fast adjustment possibility. If different workpiece types are conveyed in a chaotic order on a belt, each workpiece carrier has to be set individually or the set contact force has to be able to be checked easily. An individual marking 12 of the individual workpiece carriers can be helpful in this respect.

The spacing of the workpiece carriers from one another is maintained via spacers 47 47a. A ring-shaped buffer 46 of elastic material is mounted therebetween which is deformed on the accumulation of a plurality of workpiece carriers behind one another such that it contacts the lateral walls of the chain guidance and thus transfers the accumulation pressure, caused by the workpiece carrier accumulation, at least partly to the lateral guide walls. The total accumulation pressure of the accumulated workpiece carriers thus does not bear on the stop or on the separator causing the workpiece carrier accumulation. The elastic ring furthermore acts as a shock absorber for the incoming workpiece carriers. The shock is thus alleviated which would otherwise be caused by the workpiece carriers traveling onto the end of the accumulation.

Figure 3:
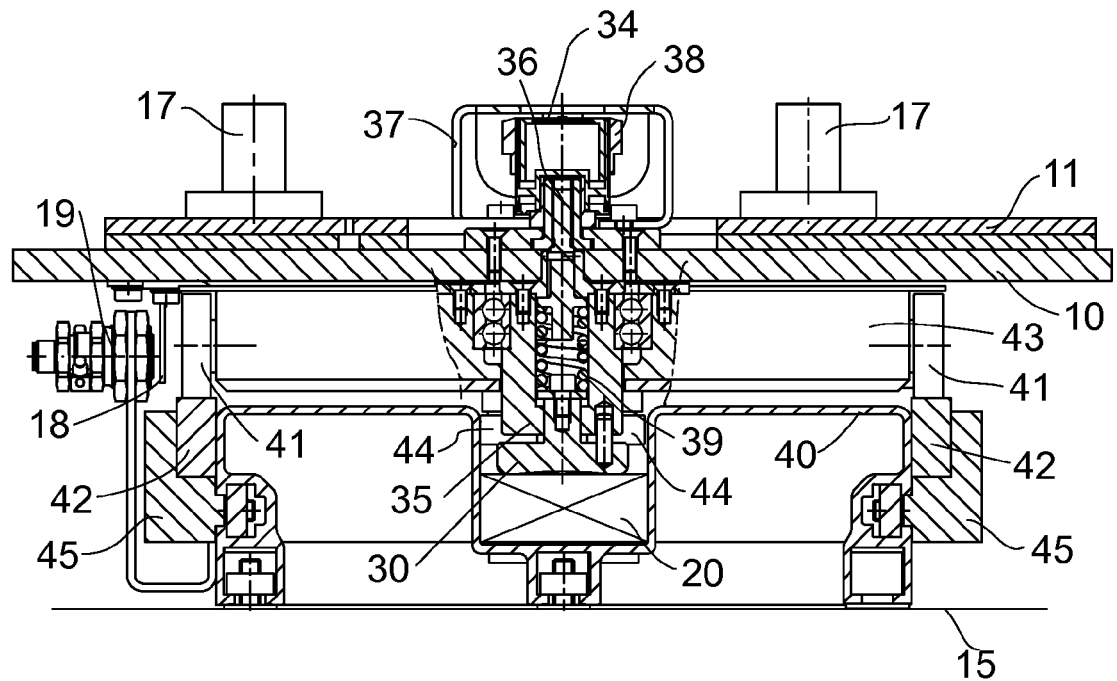
FIG. 3 shows a cross-section through a workpiece carrier in the region of the entrainer.

FIG. 3 shows a cross-section through a carriage 43 of a workpiece carrier in accordance with the present disclosure in the region of the entrainer 35. The carriages 43 are guided laterally in the base belt body 40 by the guide rollers 44 in the U-shaped cut-out in which the belt 20 likewise runs. The roller rails 42 are mounted at the base belt body via laterally attached clamping pieces 45. The carriages 43 run on these with their casters 41 and thus substantially support the workpiece weight on the base belt body. The belt 20 is loaded with the contact force via which the workpiece carriers are transported by means of the entrainers.

The foot part 30 guided in the entrainer 35 is pressed against the belt 20 via a spring 39 and takes along the workpiece transport device in the belt conveying direction via friction. The contact pressure of the spring 39 is applied with the aid of a plunger 36 via the adjustment apparatus 38 with a display 34. The installation space of the spring is limited by a vertical adjustment of the plunger 36 to the bottom and the contact force is thus increased. At the same time, the display 34 attached upwardly in the cover of the adjustment apparatus changes by the rotation of the adjustment apparatus and delivers a reference value for the set contact force. This value may be transferred to further entrainers such that the adjustment apparatus is rotated so long with them until this value is likewise reached. The same contact force is thus set in these entrainers. The manner in which this force is set, however, depends on the mechanical design of the adjustment apparatus 38. Similarly, a hydraulic piston could be displaced here and thus increase the contact force of the spring. In this case, the hydraulic pressure in the adjustment system could be used as the reference value.

The reading unit 19 for evaluating the data of the (workpiece carrier) identification device 18 can here still be recognized laterally at the base belt body 40. The workpiece supports 11, in this case configured in an embodiment as mounting pins 17, are mounted on the workpiece carriers.

Figure 4:
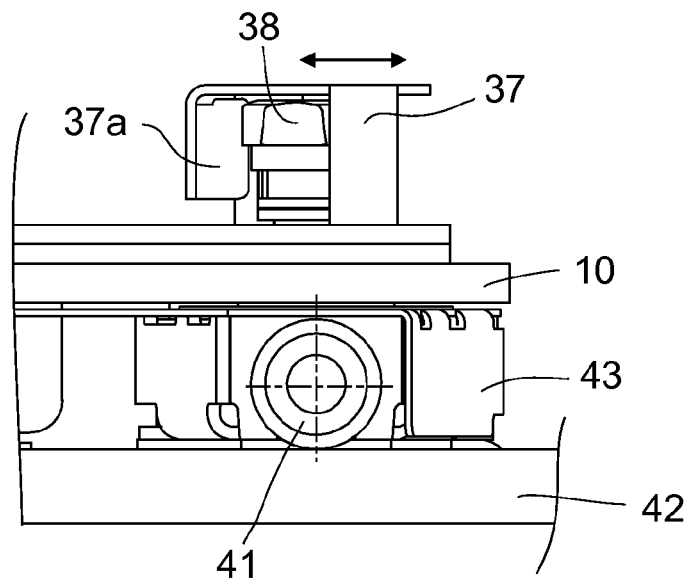
FIG. 4 shows a detailed view of a workpiece carrier with an adjustment device and a protective cover.

A detailed view of a carriage of a workpiece carrier is again shown in FIG. 4. An embodiment is shown here for a security 37a system against accidental adjustment which is integrated into the protective cover 37 for the adjustment apparatus 38 for the contact pressure. The protective cover displaceable in the direction of the arrow engages laterally in cut-outs at the rotational button of the adjustment device 38 and thus prevents an unwanted adjustment of the contact pressure. The embodiment of the security against adjustment, however, depends greatly on how the contact pressure is set (rotation, displacement, etc.) and is shown by an example here.

Figure 5:
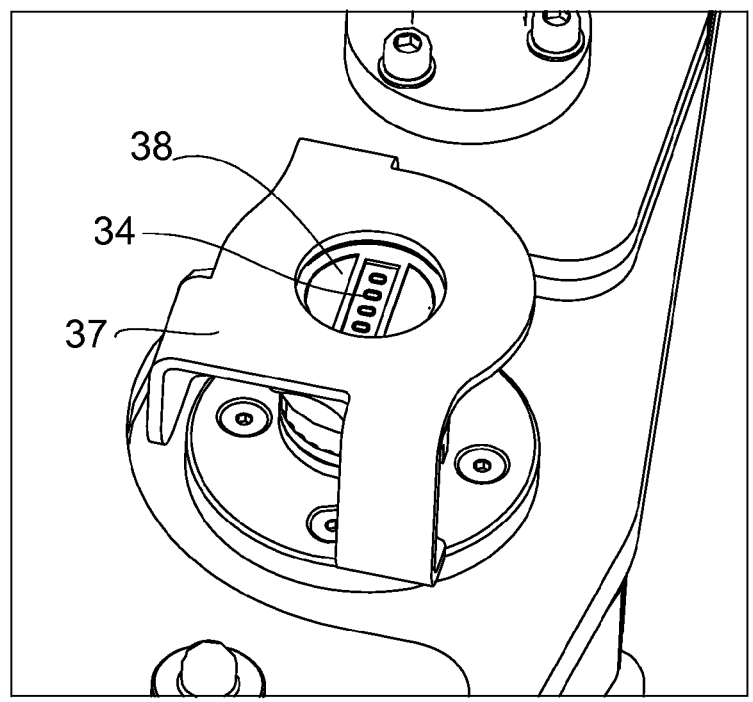
FIG. 5 shows a detailed view of a workpiece carrier with an adjustment device and an example display device.

In FIG. 5, an example of a display apparatus 34, as a digital display of a numerical value—is shown in relation to a detailed view of a workpiece carrier.

The invention claimed is:

1. A workpiece conveying device for transportation of workpieces, comprising:

a conveyor chain for conveying workpiece carriers by transmitting friction forces; and a U-shaped guide track for guiding and supporting the conveyor chain and the workpiece carriers;

wherein support surfaces of the device extend next to the U-shaped guide track and the workpiece carriers are supported with guide rollers on said support surfaces, wherein each of the workpiece carriers are equipped with a front and a rear carriage which are each provided with an adjustable entrainer for engagement into a U-shaped cut-out, wherein the adjustable entrainers for the workpiece carriers are designed via a foot part with an adjustable contact force to overcome sliding friction, wherein the adjustable entrainers with the foot part each have a display device for visualizing a set contact force, and wherein the display devices for visualizing the set contact force in the entrainers display a value for one or more of a set path, a set force or a set pressure.

2. The workpiece conveying device in accordance with claim 1, further comprising adjustment devices for setting the contact force for the adjustable entrainers, wherein the adjustment devices are each equipped with a protective cover which prevents an unintentional adjustment of the contact force and protects the adjustment devices from damage.

3. The workpiece conveying device in accordance with claim 1, wherein adjustment devices for setting the contact force for the adjustable entrainers are each equipped with a protective cover; and wherein a blockage apparatus and/or clamping apparatus which prevents an unwanted adjustment of the contact force is integrated into the protective covers.

4. The workpiece conveying device in accordance with claim 1, wherein adjustment devices for setting the contact force for the adjustable entrainers are each equipped with a protective cover and with a quick-change unit which allows a tool-free removal, displacement, rotation or tilting of the protective cover, and wherein the adjustment devices are set to a new value in a time-saving manner.

5. The workpiece conveying device in accordance with claim 1, wherein the workpiece carriers are equipped with a workpiece carrier identification device with which the workpiece carriers are unambiguously identifiable, and wherein workpiece carriers having different workpiece types and differing entrainer contact forces are conveyed together on the workpiece conveying device.

6. The workpiece conveying device for utilizing workpiece carriers in accordance with claim 1, wherein workpiece carriers are used on the workpiece conveying device with a differently set contact force for conveying different workpiece types.

7. A method for adjusting a plurality of workpiece carriers for a workpiece conveying device, comprising:

conveying the plurality of workpiece carriers on a conveyor chain by transmitting friction forces, wherein a U-shaped guide track guides and supports the conveyor chain and the workpiece carriers, and support surfaces extend next to the U-shaped guide track, the workpiece carriers supported with guide rollers on the support surfaces;

setting a contact force on entrainers to overcome sliding friction, the entrainers provided on front and rear carriages of the workpiece carriers, and engaged into a U-shaped cut-out;

visualizing the set contact force on the entrainers on a display device coupled to a foot part of each of the entrainers;

setting the contact force on a first of the plurality of workpiece carriers by reading off a value from the display devices; and transferring the set contact force to a remainder of the plurality of workpiece carriers.

8. The method in accordance with claim 7, wherein the transferring further includes setting the contact force in an adjustment device of each of the entrainers, and actuating the adjustment devices until the value on the display devices corresponds to a predefined value.

9. The method in accordance with claim 7, further comprising checking the set contact force based on user input following visual inspection of the display devices.

10. The method in accordance with claim 9, further comprising, setting the contact force on a wear-induced reduction of a friction take-along force; and correcting adjustment devices by a predefined value for all of the plurality of workpiece carriers.

* * * * *